(12) United States Patent
Gerl (10) Patent No.: US 9,667,052 B2
(45) Date of Patent: May 30, 2017

(54) MATCHED SEAL FEEDTHROUGH

(71) Applicant: Schott AG, Mainz (DE)

(72) Inventor: Gabriele Gerl, Landshut (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/067,695

(22) Filed: Mar. 11, 2016

(65) Prior Publication Data
US 2016/0268791 A1 Sep. 15, 2016

(30) Foreign Application Priority Data

Mar. 12, 2015 (DE) .......................... 10 2015 003 133
Sep. 2, 2015 (DE) .......................... 10 2015 216 761
Feb. 23, 2016 (DE) .......................... 10 2016 202 763

(51) Int. Cl.
*H01B 17/30* (2006.01)
*H02G 3/22* (2006.01)

(52) U.S. Cl.
CPC .............. *H02G 3/22* (2013.01); *H01B 17/30* (2013.01)

(58) Field of Classification Search
None
See application file for complete search history.

(56) References Cited

U.S. PATENT DOCUMENTS

| 4,678,358 A * | 7/1987 | Layher .................... C03C 27/02 |
| | | 174/152 GM |
| 2003/0096162 A1 | 5/2003 | Lasater et al. |
| 2004/0101746 A1 | 5/2004 | Ota et al. |

FOREIGN PATENT DOCUMENTS

| DE | 103 48 943 A1 | 5/2004 |
| EP | 0 517 685 A1 | 10/1985 |
| EP | 1 455 160 A1 | 9/2004 |

* cited by examiner

*Primary Examiner* — Dimary Lopez Cruz
(74) *Attorney, Agent, or Firm* — Taylor IP, P.C.

(57) ABSTRACT

A matched seal feedthrough comprising: a support body having at least one passage opening, wherein the support body has a first coefficient of thermal expansion $\alpha_1$; at least one functional element; and an electrical insulation fixing material consisting of a glass material, wherein the fixing material has a second coefficient of thermal expansion $\alpha_2$, and the second coefficient of thermal expansion $\alpha_2$ is substantially the same as the first coefficient of thermal expansion $\alpha_1$; wherein the at least one functional element has an outside circumferential surface and is held in the at least one passage opening by the fixing material, the outside circumferential surface includes at least partially a coating with at least one of nickel and nickel alloy resulting in a coated region and an uncoated region of the outside circumferential surface, and the fixing material covers the coated and uncoated region at least partially.

19 Claims, 7 Drawing Sheets

PRIOR ART

PRIOR ART

PRIOR ART

PRIOR ART

| Material Functional element | Coating outside circumferential surface Functional element | Portion of coated functional element that protrudes into the passage opening | Portion of uncoated functional element that protrudes into the passage opening | Hermeticity (seal tightness TARGET: <1x10⁻⁸ mbar l/s With helium at 1 bar pressure difference according to MIL-STD 883, Method 1014, A4 | Result: saline spray test According to MIL-STD 883, Method 1009 (24h) TARGET: Corrosion damage <5% No wire break after bending 90° |
|---|---|---|---|---|---|
| KOVAR® | blank | 0% | 100% | Tight <1x10⁻⁸ mbar l/s | Not o.k. Corrosion >5% Wire break |
| KOVAR® | galv. Ni 2μm | 100% | 0% | Tight <1x10⁻⁸ mbar l/s (measured in range 1x10⁻⁹ mbar l/s) | Not o.k. Corrosion >5% Wire break |
| KOVAR® | galv. Ni 4-8 μm | 100% | 0% | leaking >1x10⁻⁸ mbar l/s (measured in range 1x10⁻⁶ mbar l/s) | o.k. Corrosion damage <5% No wire break after bending 90° |
| KOVAR® | galv. Ni 4-8 μm | 50% | 50% | Tight <1x10⁻⁹ mbar l/s | o.k. Corrosion damage <5% No wire break after bending 90° |
| KOVAR® | galv. Ni 4-8 μm | 70% | 30% | Tight <1x10⁻⁸ mbar l/s | o.k. Corrosion damage <5% No wire break after bending 90° |
| KOVAR® | galv. Ni 4-8 μm | 80% | 20% | Tight <1x10⁻⁸ mbar l/s | o.k. Corrosion damage <5% No wire break after bending 90° |

MATCHED SEAL FEEDTHROUGH

BACKGROUND OF THE INVENTION

1. Field of the Invention

The invention relates to a matched seal feedthrough for glass-to-metal applications.

2. Description of the Related Art

On feedthroughs one generally distinguishes between "matched seal feedthroughs" where the coefficients of expansion of the material of the support body and the fixing material through which the functional element or elements, for example the contact pins, are guided are substantially the same; and so-called "compression seals" where the coefficients of thermal expansion of the fixing material are different to the coefficients of thermal expansion of the support body, so that a concentric compression load occurs on the glass. Compression seals are used primarily in the field of feedthroughs for airbag ignitors, as disclosed for example in EP 1 455 160. In a matched seal feedthrough where the coefficient of thermal expansion of the support body as well as that of the fixing material is substantially the same, the problem arises in that a hermeticity of the feedthrough must be produced, since this does not occur automatically as it does with a non-matched seal feedthrough, due to the compression pressure.

In the current state of the art a connection between the metal and the glass is made possible, for example by means of a metal oxide bridge, wherein the metal oxide has a coefficient of expansion that is substantially consistent with the longitudinal expansion of the fixing material.

For this purpose, nickel-iron or nickel-iron-cobalt alloys, for example "KOVAR®" are used in the current state of the art. Use of such nickel-iron or nickel-iron-cobalt alloys, however, has the disadvantage that these alloys do not have sufficient corrosion resistance. In one further advanced design variation, the state of the art provided that the region of the functional elements that was not glazed into the fixing material was provided with a surface coating, mostly a nickel plating. However, with this type of arrangement cracks occurred in the transition area between fixing material and functional element. These do not represent a problem for gas tightness and the electrical insulation resistance since they occur to a limited extent locally, but do however for the corrosion resistance of the components, since in the region of the cracks, areas of the functional elements emerge which are not protected by a surface coating. Thus, undesired corrosion can occur on the functional elements in the region of the cracks which can result in the contact pin breaking off.

A corrosion-resistant matched seal feedthrough is described in EP 0157685 A1. In the system according to EP 0157685 A1 the previously described problem of corrosion in the region of the cracks is also described. To avoid cracks of this type, EP 0157685 A1 provides use of a functional element from the inside to the outside of the feedthrough, consisting of a bimetal instead of a functional element consisting of a single metal, wherein the part of the contact pin protruding toward the outside is manufactured from a conducting corrosion-resistant material, and the part of the functional element facing toward the inside only needs to provide the electric conductivity and mechanical rigidity. With the system according to EP 0157685 A1 it was disadvantageous that the use of a bimetal for the functional element, in particular the contact pin, consisting of different materials requires high production costs. An additional disadvantage is that the transition of the two materials is not always completely smooth and free of imperfections, which additionally favors gas pockets in the glazing.

A matched seal feedthrough is known from EP 0157 685 A1, comprising a support body with at least one passage opening, as well as a functional element with an outside circumferential surface. The functional element is held in the passage opening by a fixing material, in particular a glass material. In order to prevent corrosion, it is suggested in EP 0157 685 A1 to design the functional element, in particular the contact pin as a bimetal conductor, in other words as a conductor consisting of two different metals. A coating of a conductor for corrosion prevention is not shown in EP 0157 685 A1.

DE 103 48 943 A1 describes a hermetically sealed electric feedthrough device with a pin glazed into a fixing material. However, the feedthrough in DE 103 48 943 A1 is not a matched seal feedthrough. Coating of a conductor is also not described in DE 103 48 943 A1.

US 2003/0096162 A1 describes a feedthrough for lithium ion batteries. The glass material that is used as fixing material is a $CaO-Al_2O_3-MgO-B_2O_3$ or respectively a $CaO-Al_2O_3-B_2O_3$ system that has a thermal expansion that extensively coincides with the thermal expansion of the glazed metal pin, in the current example a molybdenum pin. The metal pins in US 2003/0096162 A1 are coated, however over the entire length of the glazed pin. Cited coating materials are platinum, platinum-iridium, platinum alloys, materials similar to platinum such as titanium, aluminum, platinum-aluminum, iridium, rhenium, ruthenium, osmium, palladium, niobium, chromium, tantalum or combinations of the aforementioned metals or their oxides. The coatings serve to better join the metal pin with the surrounding fixing material, wherein a chemical bond is formed between the fixing material and the metal pin. Corrosion resistance is not achieved by the coating, rather the selection of the glass types provides corrosion resistance.

US 2004/0101746 A1 describes a glass feedthrough wherein the Kovar conductor comprises at least a partial coating on the outside circumference. Only the top and bottom part of the conductor is provided with a coating in US 2004/0101746 A1. The middle section is not coated. No Kovar conductor is shown in US 2004/0101746 A1 where a nickel coating is in contact with the fixing material. The nickel layer in US 2004/0101746 A1 is a bonding agent under a gold plating, so that contact exists between the fixing material and gold, but not between the fixing material and nickel. An anti-corrosive effect of the nickel layer is not described in US 2004/0101746 A1. The nickel layer herein serves only as a bonding agent.

What is needed in the art is a matched seal feedthrough which avoids the aforementioned disadvantages of the current state of the art. In particular, a corrosion resistant matched seal feedthrough is needed that distinguishes itself through low production costs.

SUMMARY OF THE INVENTION

The present invention provides having a support body with a least one passage opening as well as one functional element that is inserted into the passage opening in a fixing material, preferably a glass material, wherein the functional element has an outside circumferential surface and wherein the functional element is held in the fixing material in the region of the outside circumferential surface. The coefficient of thermal expansion of support body and fixing material is substantially the same.

The functional element may for example be a contact pin, a hollow conductor or a support element for additional functional elements, etc.

According to the invention this objective is met in that, with a matched seal feedthrough with a support body and at least one passage opening, the support body has a first coefficient of thermal expansion $\alpha_1$. The feedthrough moreover includes at least one functional element and one fixing material, wherein the fixing material has a second coefficient of thermal expansion $\alpha_2$, and the second coefficient of thermal expansion $\alpha_2$ is substantially consistent with the first coefficient of thermal expansion $\alpha_1$. The functional element moreover includes an outside circumferential surface. The functional element is held by the outside circumferential surface in the fixing material of the passage opening. The functional element may for example be a contact pin. According to the invention the contact pin is covered partially with a coating of nickel or a nickel alloy, in particular a nickel-phosphor alloy. The functional element is preferably introduced into the insulating fixing material, in particular the glass material over a length L of the so-called glazing length.

In order to provide not only an anti-corrosive effect but also a hermetic seal, it is provided that the coating is applied only over part of the glazing length L on the functional element, preferably the pin. The coated area is preferably applied over at least 95%, preferably at least 80%, in particular at least 70%, preferably at least 60%, in particular at least 50%, especially preferably at least 40%, in particular at least 20%, especially preferably at least 5% of the glazing length.

The inventors have surprisingly found that a functional element, in particular a pin that is coated over its entire glazing length L is in fact corrosion resistant, does however not provide the necessary impermeability against a leakage rate of less than $10^{-8}$ mbar/l for gaseous helium. A functional element, in particular a pin that is coated over its entire length L has a tightness of only $10^{-6}$ mbar/l for gaseous helium. This leakage rate is not sufficient for a hermetic seal. If the coating covers only part of glazing length L, for example less than 95% and at least 5% of glazing length L, then a hermetic seal having a leakage rate of less than $10^{-8}$ mbar/l for gaseous helium, as well as sufficient corrosion resistance is achieved.

The inventive solution is characterized in that a coating is applied at least partially on the outside circumferential surface of the functional element, so that a coated and an uncoated region result on the outside circumferential surface. The matched seal feedthrough is configured such that the fixing material covers the coated, as well as the uncoated area at least partially. This type of arrangement ensures that, due to the only partial coating of the functional element, in particular in the embodiment of a contact pin, the uncoated part of the contact pin can produce a chemical bond between glass and contact pin, whereas the coated part contributes to increasing of the corrosion resistance in an area of the fixing material, in particular a glass, that for example may be exposed to a corrosive attack due to a crack.

Through the partial coating of the contact pin, wherein the coating permeates at least into a part of the fixing material it is achieved that, on the one hand in the areas where no coating is applied, the hermetic seal of contact pin and fixing material is produced through the bond of contact pin and fixing material, and on the other hand corrosion is prevented in the coated. Partial coating along glazing length L provides in particular the hermetic seal having a leakage rate of less than $10^{-8}$ mbar l/s helium. This was surprising for the expert.

In contrast to the solution that is described in EP 0157685 A1 the arrangement according to the invention is characterized by very simple manufacturability, high impermeability, as well as high corrosion resistance. In particular, no bimetal needs to be used as conductor.

In one advanced design variation of the matched seal feedthrough it may be provided that the difference $\Delta\alpha$ between the first coefficient of expansion $\alpha_1$ and the second coefficient of thermal expansion $\alpha_2$ is $\Delta\alpha<20\%$, preferably $\Delta\alpha<5\%$. The coefficients of expansion $\alpha_1$ and $\alpha_2$ are preferably in the range of $0.1\cdot10^{-6}/K \leq \alpha_1$, $\alpha_2 \leq 100\cdot10^{-6}/K$, preferably in the range of $2\cdot10^{-6}/K \leq \alpha_1$, $\alpha_2 \leq 15\cdot10^{-6}/K$.

As a rule, $\alpha_2$ describes the coefficient of expansion or respectively the CTE of the glass or glass ceramic material, $\alpha_1$ the coefficient of expansion or respectively the CTE of the support body, and the difference $\Delta\alpha$ is:

$$\Delta\alpha = \frac{|\alpha 1 - \alpha 2|}{\alpha 2} \cdot 100$$

A preferred material for the support body is an iron-nickel-cobalt alloy, for example KOVAR®, that typically has a coefficient of thermal expansion of approximately 5 ppm/K, that is $5\cdot10^{-6}$ 1/K and a composition of 54% iron, 29% nickel and 17% cobalt. The functional element or the contact pin includes on its outside circumferential surface a coating preferably a coating that includes nickel or a nickel alloy. Especially preferred are nickel-phosphor alloys that provide high corrosion protection which is founded essentially by the phosphor content of the alloy. With a matched seal feedthrough, the functional element is preferably pin-shaped, in particular a pin-shaped conductor, in particular in the embodiment of a contact pin.

The functional element in the embodiment of the pin-shaped element preferably comprises a nickel alloy, NiFe or NiFe with a Cu-interior part or respectively Cu-jacket. NiFeCo, NiFeCr or NiCr would also be possible.

It is especially preferred if at least 30%, preferably at least 50% in particular at least 60% of the outside circumferential surface, especially preferably between 30% and 70% of the outer circumferential surface of the functional element, in particular the pin-shaped element is provided with a coating.

With matched seal feedthroughs, non-organic materials, in particular glass materials, preferably a borosilicate glass material having the following composition in weight –% are preferably used as fixing materials:

| | |
|---|---|
| $SiO_2$ | 61-72 |
| $Al_2O_3$ | <10 |
| $B_2O_3$ | 14-23 |
| $K_2O$ | 5-10 |
| $Li_2O$ | <3 |
| $Na_2O$ | <7 |
| ZnO | <1 |
| $\alpha_2$ | $4\cdot10^{-6}/K$ to $6\cdot10^{-6}/K$ |

Depending on the composition, the coefficient of thermal expansion of such borosilicate glasses is in the range of $4\cdot10^{-6}/K$ to $6\cdot10^{-6}/K$.

Especially preferred is a borosilicate glass having the following composition:

| | |
|---|---|
| $SiO_2$ | 68.8 |
| $Al_2O_3$ | 2.7 |

-continued

| | |
|---|---|
| $B_2O_3$ | 18.3 |
| $K_2O$ | 7.8 |
| $Li_2O$ | 0.6 |
| $Na_2O$ | 0.8 |
| ZnO | 0.6 | and an $\alpha_2$ or respectively a CTE of $4.9 \cdot 10^{-6}$/K.

The invention makes it possible that—at least in the area of the passage opening—the feedthrough is corrosion resistant according to MIL-STD-883J method 1009.8. This method is known to the expert and represents a test method for corrosion resistance of a component that incorporates the described feedthrough.

In particular, at least the functional element, for example the contact pin is corrosion resistant according to standard MIL-STD-883J method 1009.8, at least in the area of the passage opening.

Standard MIL-STD-883J method 1009.8 represents a method of an accelerated laboratory test on corrosion, realized by means of a salt atmosphere test. The following briefly summarizes its content. Additional details are available to the expert from the known standard. According to MIL-STD-883J method 1009.8 the attack on a coating and/or a base material in particular are tested through electrochemical reactions. Damage symptoms are in particular detachments and/or blistering and/or formation of indentations. A 0.5-3.0 percent (stated in weight percent) saline solution (NaCl in de-ionized water) is used. The component that is to be tested is subjected to the atomized saline solution that should be at least 35° C. according to test condition A for 24 hours at a temperature of 35° C.±3° C. The saline mist concentration in the test chamber and its introduction rate is between 20000 and 50000 mg/m²/24 hours. The component has passed the test when at most 5% of the component surface, apart from the lead (for example of a contact pin) display corrosion-based error patterns, or if leads (inter alia the functional element, for example a contact pin) display corrosion based error patterns. In the latter case, bending tests will be conducted with the lead.

The matched seal concept is used in particular for feedthroughs, in particular feedthroughs that require tight seals against gases and/or require electrical insulation. The inventive matched seal feedthrough can in particular be designed surprisingly tightly hermetically sealed. This means that the leakage rate of gaseous helium through the feedthrough is $10^{-8}$ mbar l/s or less, for example $10^{-9}$ mbar l/s. Tight seals of this type can only be achieved if the coated part of the functional element, for example the contact pin only, protrudes into a part of glazing length L into the fixing material, for example between 95% and 5%.

Leakage tests to determine the leakage rate can be conducted with the assistance of a helium leakage detector that operates according to the principle of the mass-spectrometer. With gaseous helium being the testing medium, the lowest leakage rates of up to $10^{-12}$ mbar l/s can be detected with modern leakage sensors. Measuring of extremely low leakage rates is however only possible under laboratory conditions and requires long pumping and measuring cycles. Under normal circumstances, leakage rates of up to $10^{-8}$ mbar l/s can realistically be measured; in this case, the pressure differential between inside and outside is 1 bar.

The hermetically sealed feedthroughs can find use in the aerospace industry. Also, use in a hermetically sealed hybrid housing, in particular in sensors and/or components for measurement and/or controller electronics and/or microprocessors, in particular for radar applications and/or laser warning systems and/or DC/DC converters is possible.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
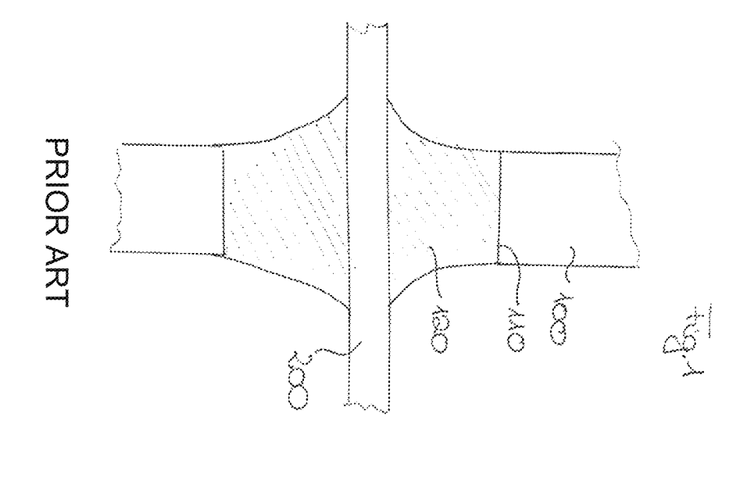
FIG. 1 illustrates the principle view of a matched seal feedthrough, having a support body for a contact pin introduced into the passage opening in an electrically insulating fixing material.

FIG. 1 illustrates the principle structure of a matched seal feedthrough as is realized currently in one variation in the current state of the art.

Support body 100 is clearly recognizable. It has a first coefficient of thermal expansion $\alpha_1$, as well as opening 110 that is introduced into the support body and which holds a functional element 200, preferably in the embodiment of a conductor, in particular a contact pin in a fixing material 120. Fixing material 120 is preferably a non-organic material, in particular a glass material and holds the support body, in this case contact pin 200 in opening 110 of the support body.

Coefficient of thermal expansion $\alpha_2$ of the fixing material, in particular the glass material, coincides substantially with the coefficient of the expansion $\alpha_1$ of the material of support body 100. The material of the support body 100 may for example be an iron-nickel-cobalt alloy that is also known as KOVAR®. Coefficient of expansion $\alpha_1$ of such an iron-nickel-cobalt alloy is in the range of 5 ppm/K, in other words $5 \cdot 10^{-6}$/K.

A borosilicate glass for example having a CTE or respectively $\alpha_2$ between $4 \cdot 10^{-6}$/K and $6 \cdot 10^{-6}$/K can be provided as the fixing material for the functional element. In a special arrangement of a borosilicate glass the coefficient of expansion $\alpha_2$ is at 4.9 ppm/K or $4.9 \times 10^{-6}$/K.

The deviation of the coefficient of expansion, in other words the Δα of the nickel-cobalt alloy and borosilicate glass, is then approximately 2%, meaning that a matched seal is provided.

Since with borosilicate glasses a CTE between $4 \cdot 10^{-6}$/K and $6 \cdot 10^{-6}$/K can be set depending on glass composition, it is possible to provide a matched seal for different materials of the base body.

With the arrangement according to FIG. 1 a gas-tight connection in the hermetically sealed matched feedthrough is made possible by means of an iron-oxide bridge. This is provided by the iron-nickel-cobalt alloy. A disadvantage with such iron-nickel-cobalt alloys is however that they are not sufficiently corrosion free.

Figure 2:
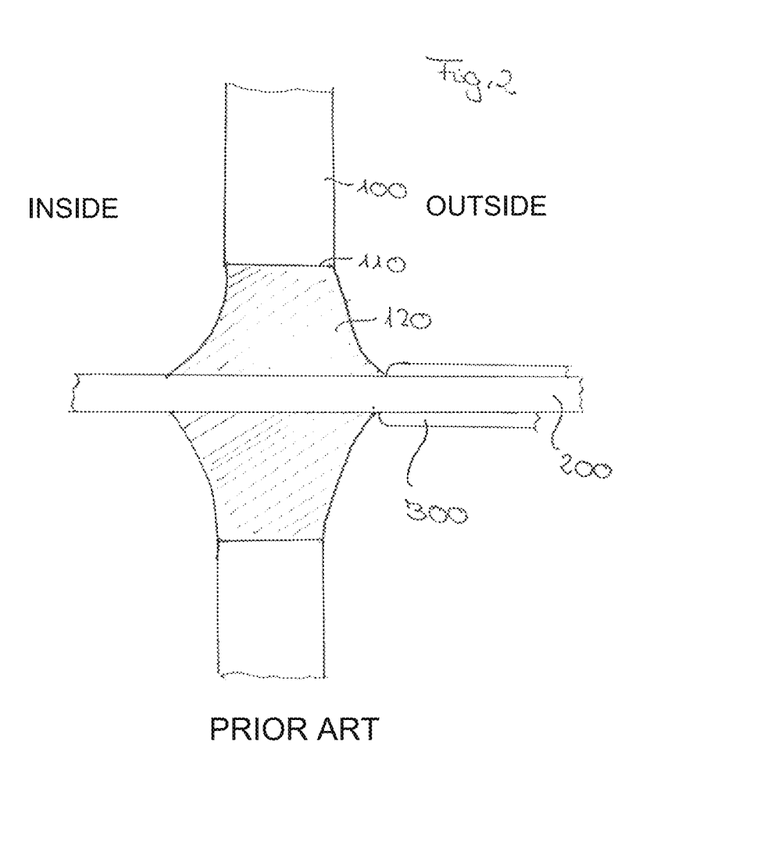
FIG. 2 illustrates the application of an anti-corrosion coating onto the contact pin, according to the current state of the art.

In the current state of the art—as illustrated in FIG. 2—the functional element, in this case the electric conductor or contact pin 200, is covered with a protective coating 300 in the area that protrudes out of fixing material 120, that is the glass material.

Figure 3:
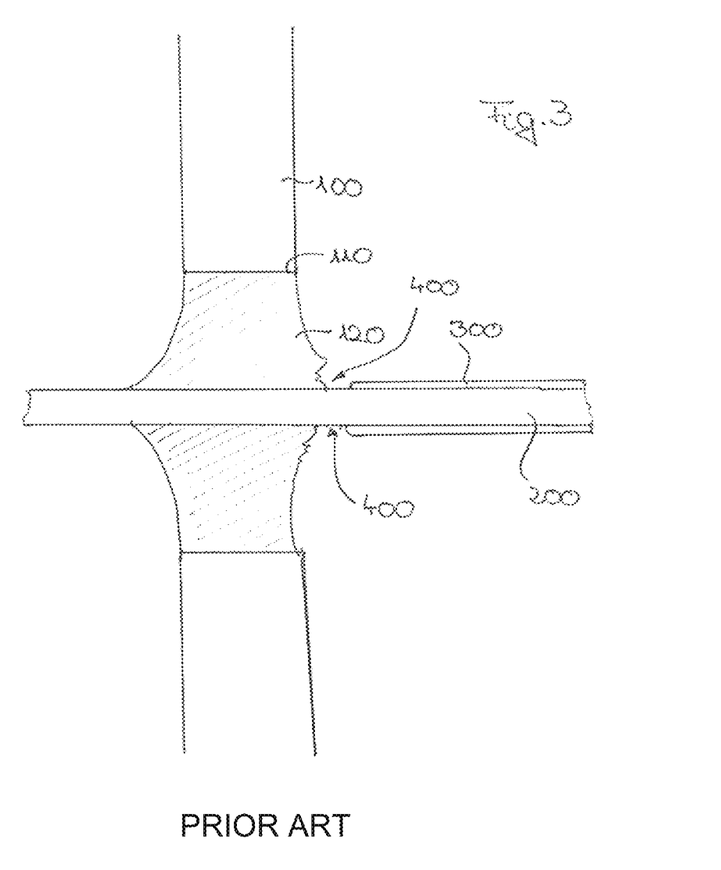
FIG. 3 illustrates the formation of cracks on components having anti-corrosion coating according to the current state of the art.

If, as illustrated in FIG. 3, cracks 400 occur in a feedthrough according to the current state of the art in the region between contact pin 200 and fixing material 120, cracks 400 do not represent a problem for the gas tightness and the electrical insulation resistance, since they only occur locally. However, such cracks 400 represent a danger for the corrosion resistance of the components since, in the area of the cracks parts of contact pin 200 appear that are not protected by a surface coating 300. These parts are then attacked by corrosion which, in an extreme case, can lead to the contact pin breaking off.

Figure 4:
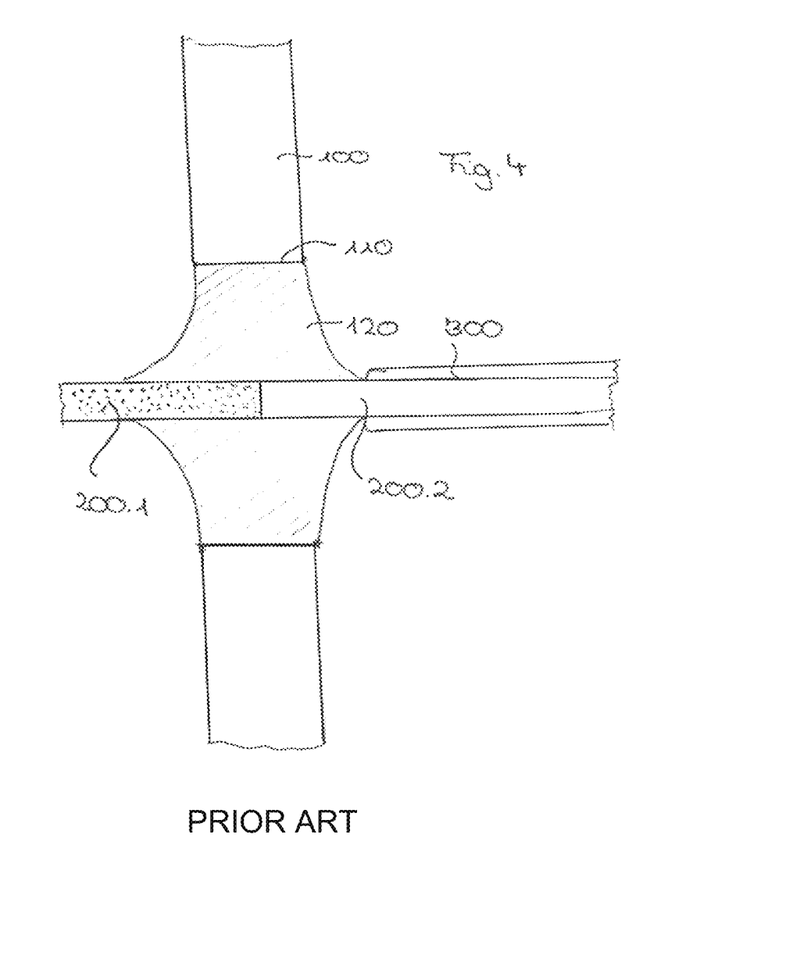
FIG. 4 is the arrangement of a contact pin according to EP 0157685 A1.

FIG. 4 illustrates one arrangement of a matched seal feedthrough, as has become known from EP 0157685 A1. According to EP 0157685 A1 the material of the support body, here the metal pin, preferably contact pin 200 is composed of two materials, a first material 200.1 and a second material 200.2. The support body includes thus a bimetal. Again, second material 200.2 in the current example is provided with a coating 300. It is disadvantageous in the arrangement according to EP 0157685 A1, in that the manufacture of a contact pin consisting of two different materials is very expensive.

Figure 5:
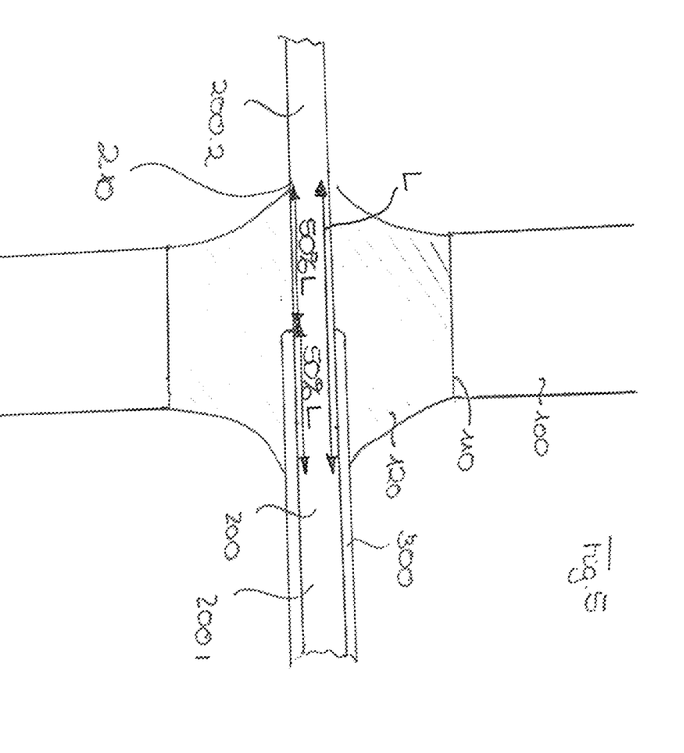
FIG. 5 illustrates the matched seal feed through arrangement according to the invention.

As illustrated in FIG. 5 the invention therefore provides that the contact pin is provided with a coating 300 which, however, extends on functional element 200, in this case the contact pin on its outside circumference into the area that is covered by fixing material 120, in the current example the glass material. As can be seen in FIG. 5 it is thus provided according to the invention that the outside circumferential surface of functional element 200 is not completely covered by coating 300, but only partially. The contact pin thus has a coated region 200.1 and an uncoated region 200.2 on outside circumference surface 210 of the contact pin, wherein fixing material 120, covers coated region 200.1 as well as uncoated region 200.2 of the contact pin. Uncoated region 200.2 serves to produce the chemical bond between contact pin and fixing material. Coated region 200.1 of the coating pin serves to prevent a corrosion attack upon the contact pin in the area that can be damaged by cracks, as illustrated in FIG. 3. Regardless of the glazing-depth, the coated region of the contact pin must protrude into the glazed region at least 0.254 mm. This is required by the world-wide applicable specification JEDEC 9B for these types of components. The at least 0.254 mm are the maximum permissible depth for glass chipping and thus the region in which the contact pin is exposed and subject to corrosion.

The inventive arrangement according to FIG. 5 thus represents a matched seal feedthrough that is simple to produce and which on the one hand is hermetically sealed, and on the other hand is not subjected to any corrosion, since the contact pin is protected by means of a coating 300 in the critical area where cracks could occur. On the other hand, a hermetically sealed connection is provided between contact pin and fixing material due to the contact of the uncoated region of the contact pin with the fixing material. The leakage rate herein of gaseous helium through the feedthrough is $10^{-8}$ mbar l/s or lower, for example $10^{-9}$ mbar l/s. Leakage tests to determine the leakage rate can be carried out with the assistance of a helium leakage detector that operates according to the principle of a mass-spectrometer. With gaseous helium as the testing medium, modern leakage detectors are able to detect lowest leakage rates to $10^{-12}$ mbar l/s. Measuring of extremely low leakage rates is however only possible under laboratory conditions and requires long pumping and measuring cycles.

Under normal circumstances, leakage rates of for example $10^{-8}$ mbar l/s can be realistically measured; in this case the pressure differential between inside and outside is 1 bar. Surprisingly, the lower leakage rates of $10^{-8}$ mbar l/s or lower, for example $10^{-9}$ mbar l/s are only achieved if the coated region 300—preferably coated with nickel or a nickel alloy—does not extend over entire glazing length L of the pin in fixing material 120. The inventors surprisingly found that a hermetic seal is achieved only, if the coating protrudes over 5% to 95% of glazing length L into the fixing material, in other words, if the pin is not fully coated over the entire glazing length L. One embodiment is illustrated in FIG. 5 wherein 50% of glazing length L of illustrated contact pin 200 is coated and 50% of the glazing length of the pin is uncoated. The dependency of the hermeticity and corrosion resistance of differently coated functional elements or respectively contact pins can be gathered from the table in FIG. 7.

Figure 7:
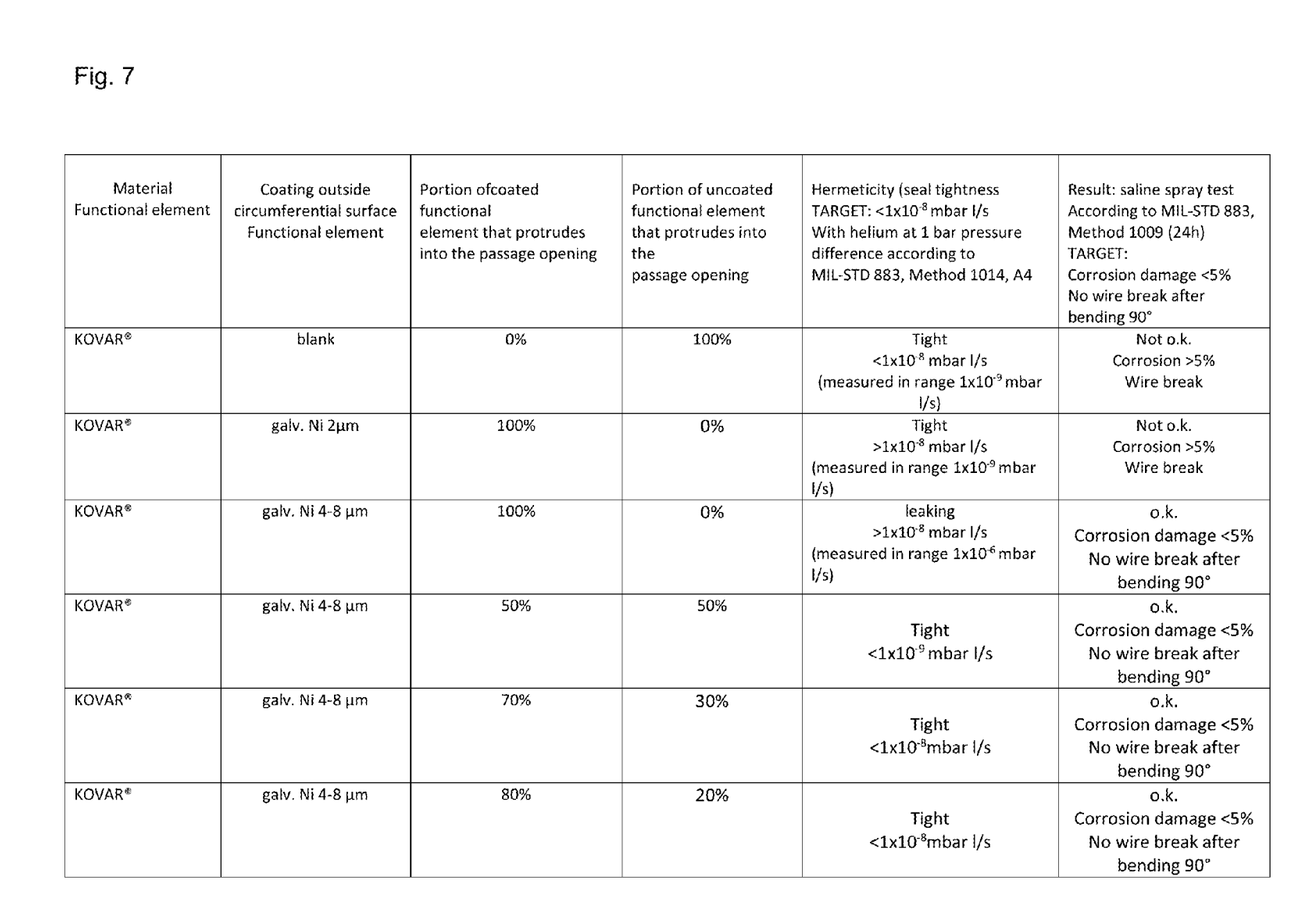
FIG. 7 is a chart illustrating impermeability and corrosion resistance in relation to coating.

As can be seen in FIG. 7, an uncoated functional element or a functional element having a 2 μm nickel layer is in fact sealed, but not corrosion resistant. A functional element coated with a 4-8 μm thick nickel layer over the entire glazing length L (portion of coated functional element protruding into the passage opening is 100%) is in fact corrosion resistant but not sealed. Only if the coated portion is greater than 50%, 70% or 80% of the glazing length, as can be seen for example in the latter design examples in FIG. 7, a tightness of $<10^{-8}$ mbar l/s, or $<10^{-8}$ mbar l/s, as well as an advantageous corrosion resistance is achieved.

Figure 6A:
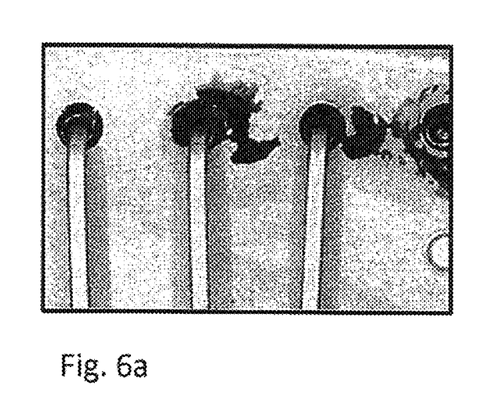
FIG. 6a is a photograph of corrosion damage after testing according to MIL-STD-883J method 1009.8 Test Condition A of a feedthrough according to the current state of the art.

FIG. 6a shows a photograph of a feedthrough according to the current state of the art, that was subjected to the described corrosion test according to MIL-STD-883J Method 1009.8, Test Condition A. The illustrated feedthrough did not pass this test, since there clearly is damage on the support body that are noticeable through the dark areas around the feedthrough.

Figure 6B:
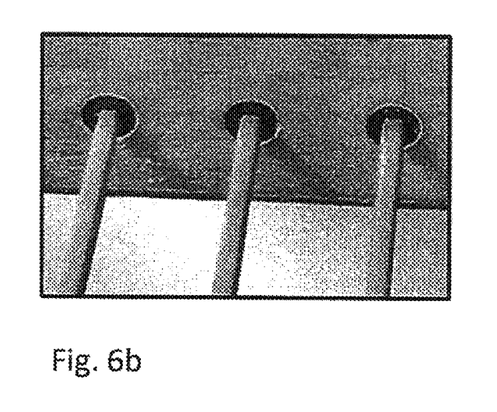
FIG. 6b is a photograph of corrosion resistance after testing according to MIL-STD-883J method 1009.8 Test Condition A of a feedthrough according to the invention.

FIG. 6b shows the photograph of a feedthrough according to the invention that was subjected to the described corrosion test according to MIL-STD-883J Method 1009.8, Test Condition A, and passed. As can be seen, the support body does not show any corrosion damage.

As described, the invention improves the reliability in particular of hermetic packages. The feedthrough according to the invention is especially relevant for applications with particularly rough environmental conditions, for example for aerospace applications.

The feedthrough according to the invention can be used for sealed, especially hermetically sealed hybrid housings.

These are used advantageously for encapsulation of multi-chip modules, for example sensors and/or components for measurement and/or controller electronics and/or microprocessors. These are used for example in the aerospace industry for radar applications, laser warning systems or DC/DC converters.

The feedthrough according to the invention has in particular the advantage that the mechanical integrity of the glass-metal bond in the feedthrough is not affected.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A matched seal feedthrough comprising:
   a support body having at least one passage opening, wherein the support body has a first coefficient of thermal expansion $\alpha_1$;
   at least one functional element; and
   an electrical insulation fixing material consisting of a glass material, wherein the fixing material has a second coefficient of thermal expansion $\alpha_2$, and the second coefficient of thermal expansion $\alpha_2$ is substantially the same as the first coefficient of thermal expansion $\alpha_1$;
   wherein the at least one functional element has an outside circumferential surface and is held in the at least one passage opening by the fixing material, the outside circumferential surface includes at least partially a coating with at least one of nickel and nickel alloy resulting in a coated region and an uncoated region of the outside circumferential surface, and the fixing material covers the coated and uncoated region at least partially.

2. The matched seal feedthrough according to claim 1, wherein the difference between the first coefficient of expansion $\alpha_1$ and the second coefficient of expansion $\alpha_2$ is less than 20%.

3. The matched seal feedthrough according to claim 1, wherein the difference between the first coefficient of expansion $\alpha_1$ and the second coefficient of expansion $\alpha_2$ is less than 5%.

4. The matched seal feedthrough according to claim 1, wherein the at least one functional element is introduced over a glazing length L into the fixing material.

5. The matched seal feedthrough according to claim 4, wherein the coated region of the at least one functional element extends over at least 5% of the glazing length L.

6. The matched seal feedthrough according to claim 4, wherein the coated region of the at least one functional element is between 95% and 5% of the glazing length L.

7. The matched seal feedthrough according to claim 1, wherein the coefficient of expansion $\alpha_1$ and the coefficient of expansion $\alpha_2$ are in the range of $2 \cdot 10^{-6}/K \leq \alpha_1, \alpha_2 \leq 15 \cdot 10^{-6}/K$.

8. The matched seal feedthrough according to claim 1, wherein the coefficient of expansion $\alpha_1$ and the coefficient of expansion $\alpha_2$ are in the range of $0.1 \cdot 10^{-6}/K \leq \alpha_1, \alpha_2 \leq 100 \cdot 10^{-6}/K$.

9. The matched seal feedthrough according to claim 1, wherein the support body comprises an iron-nickel-cobalt alloy.

10. The matched seal feedthrough according to claim 1, wherein the at least one functional element is a pin-shaped element, in particular a pin-shaped conductor, in particular a contact pin.

11. The matched seal feedthrough according to claim 10, wherein the pin-shaped element, in particular the pin-shaped conductor, in particular the contact pin comprises at least one of the following materials:
   a nickel alloy such as NiFe or NiFeCo or NiFeCr or NiCr; and
   NiFe with at least one of a Cu-interior and a Cu-jacket.

12. The matched seal feedthrough according to claim 1, wherein between 30% and 70% of the outer circumferential surface of the at least one functional element is coated.

13. The matched seal feedthrough according to claim 1, wherein the fixing material comprises a non-organic material, in particular glass materials, preferably a borosilicate glass material having a coefficient of thermal expansion of $4 \cdot 10^{-6}/K$ to $6 \cdot 10^{-6}/K$ and the following composition in weight %:

| | |
|---|---|
| $SiO_2$ | 61-72 |
| $Al_2O_3$ | <10 |
| $B_2O_3$ | 14-23 |
| $K_2O$ | 5-10 |
| $Li_2O$ | <3 |
| $Na_2O$ | <7 |
| $ZnO$ | <1 |

14. The matched seal feedthrough according to claim 1, wherein the matched seal feedthrough, at least in the area of the at least one passage opening, is corrosion resistant according to MIL-STD-883J method 1009.8 Test Condition A.

15. The matched seal feedthrough according to claim 1, wherein the at least one functional element, at least in the area of the at least one passage opening, is corrosion resistant according to Standard MIL-STD-883J method 1009.8 Test Condition A.

16. The matched seal feedthrough according to claim 1, wherein the matched seal feedthrough is used in a feedthrough having a low leakage rate of gasses, preferably having a leakage rage of at least $10^{-8}$ mbar/l for gaseous helium, and/or in a feedthrough with electrical insulation.

17. The matched seal feedthrough according to claim 1, wherein the matched seal feedthrough is used in a feedthrough with electrical insulation.

18. The matched seal feedthrough according to claim 1, wherein the matched seal feedthrough is used in an aerospace application.

19. The matched seal feedthrough according to claim 1, wherein the matched seal feedthrough is used in hermetically sealed hybrid housings, in particular in at least one of sensors and components for measurement and controller electronics and microprocessors, in particular for at least one of radar applications and laser warning systems and DC/DC converters.

* * * * *

UNITED STATES PATENT AND TRADEMARK OFFICE
CERTIFICATE OF CORRECTION

| | |
|---|---|
| PATENT NO. | : 9,667,052 B2 |
| APPLICATION NO. | : 15/067695 |
| DATED | : May 30, 2017 |
| INVENTOR(S) | : Gabriele Gerl |

It is certified that error appears in the above-identified patent and that said Letters Patent is hereby corrected as shown below:

In the Specification

Column 4
At Line 8, please delete "expansion a1", and substitute therefore --expansion $\alpha_1$--.

Signed and Sealed this
Twenty-fourth Day of July, 2018

Andrei Iancu
*Director of the United States Patent and Trademark Office*